United States Patent
Plamondon et al.

(10) Patent No.: US 12,234,765 B1
(45) Date of Patent: Feb. 25, 2025

(54) ROTARY ENGINE WITH FLUID INJECTION COOLING

(71) Applicant: PRATT & WHITNEY CANADA CORP., Longueuil (CA)

(72) Inventors: Etienne Plamondon, Candiac (CA); Jonathan Brulatout, Saint-Hubert (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/413,224

(22) Filed: Jan. 16, 2024

(51) Int. Cl.
- F02B 53/10 (2006.01)
- F02B 19/10 (2006.01)
- F02B 53/00 (2006.01)
- F02B 53/02 (2006.01)
- F02B 53/12 (2006.01)

(52) U.S. Cl.
CPC .......... *F02B 53/10* (2013.01); *F02B 19/1085* (2013.01); *F02B 53/02* (2013.01); *F02B 53/12* (2013.01); *F02B 2053/005* (2013.01)

(58) Field of Classification Search
CPC .. F02B 19/1085; F02B 19/10; F02B 19/1004; F02B 2053/005; F02B 53/10
See application file for complete search history.

(56) References Cited

U.S. PATENT DOCUMENTS

| | | |
|---|---|---|
| 4,072,132 A | 2/1978 | Lindros |
| 4,393,828 A | 7/1983 | Jolly |
| 4,696,268 A | 9/1987 | Zimmermann |
| 4,884,533 A | 12/1989 | Risitano et al. |
| RE35,237 E | 5/1996 | Gunnerman |
| 7,441,534 B2 | 10/2008 | Bastian |
| 7,938,103 B2 | 5/2011 | Keays |
| 8,875,666 B2 | 11/2014 | Strey et al. |
| 9,057,321 B2 | 6/2015 | Reitz et al. |
| 10,145,291 B1* | 12/2018 | Thomassin ......... F02B 19/1023 |
| 10,941,744 B2 | 3/2021 | Graham |
| 11,905,836 B1* | 2/2024 | Brulatout .................. F01C 1/22 |
| 12,006,882 B1* | 6/2024 | Plamondon ............. F02B 53/02 |
| 2007/0022977 A1 | 2/2007 | Crower |

\* cited by examiner

*Primary Examiner* — Ngoc T Nguyen
(74) *Attorney, Agent, or Firm* — NORTON ROSE FULBRIGHT CANADA LLP

(57) ABSTRACT

A rotary engine, has: an outer body defining a rotor cavity; a rotor within the rotor cavity, the outer body and the rotor defining a combustion chamber; a pilot subchamber defined by the outer body and having an outlet communicating with the rotor cavity; a pilot injector having a pilot tip in communication with the pilot subchamber; a main injector having a tip in communication with the rotor cavity, the main injector having a fuel inlet fluidly connected to a fuel source, a fluid inlet fluidly connected to a fluid source, and an injector outlet in fluid communication with the rotor cavity independently of the pilot subchamber, the main injector having: a fuel-injection configuration in which the main injector connects the fuel source to the combustion chamber vi; and a fluid-injection configuration in which the main injector connects the fluid source to the combustion chamber.

20 Claims, 4 Drawing Sheets

ROTARY ENGINE WITH FLUID INJECTION COOLING

TECHNICAL FIELD

The application relates generally to aircraft engines and, more particularly, to rotary engines and to systems and methods used to supply such engines with fuel for combustion and water for cooling purposes.

BACKGROUND

Operating rotary engines burning gasoline may present challenges under lean conditions since spark ignition typically requires a homogeneous mixture of fuel and air near stoichiometric conditions in order to have sufficient combustion stability. Typically, the fuel and air are premixed before being injected into the combustion chambers. Some rotary engines may use heavy fuel. However, these heavy fuels may be less environmentally friendly. Using alternative fuels may pose different challenges when used with rotary engines. Improvements are therefore sought.

SUMMARY

In one aspect, there is provided a rotary engine, comprising: an outer body defining a rotor cavity; a rotor rotationally received within the rotor cavity, the outer body and the rotor defining a combustion chamber of variable volume in the rotor cavity; a pilot subchamber defined by the outer body, the pilot subchamber having an outlet in fluid flow communication with the rotor cavity; a pilot injector having a pilot tip in communication with the pilot subchamber; a main injector having a tip in communication with the rotor cavity at a location spaced apart from the outlet of the pilot subchamber, the main injector having a fuel inlet fluidly connected to a fuel source, a fluid inlet fluidly connected to a fluid source, and an injector outlet in fluid communication with the rotor cavity independently of the pilot subchamber, the main injector having: a fuel-injection configuration in which the main injector fluidly connects the fuel source to the combustion chamber via the injector outlet; and a fluid-injection configuration in which the main injector fluidly connects the fluid source to the combustion chamber via the injector outlet.

The rotary engine described above may include any of the following features, in any combinations.

In some embodiments, a controller is operatively connected to the main injector and to the pilot injector, the controller having a processing unit and a computer-readable medium having instructions stored thereon causing the processing unit to: inject the fuel into the combustion chamber with the main injector; inject the fluid into the combustion chamber before a temperature of a mixture of air and the fuel into the combustion chamber reaches an auto-ignition temperature; and ignite of the mixture by igniting a pilot mixture of the fuel and the air into the pilot subchamber.

In some embodiments, the instructions cause the processing unit to inject the fluid into the combustion chamber before a volume of the combustion chamber reaches a minimum volume.

In some embodiments, the injector outlet of the main injector includes a fuel outlet and a fluid outlet distinct from the fuel outlet, the fuel outlet fluidly connected to the fuel source in the fuel-injection configuration, the fluid outlet fluidly connected to the fluid source in the fluid-injection configuration.

In some embodiments, the fuel is one or more of hydrogen and liquified natural gas.

In some embodiments, a distance between the tip of fuel injector and the pilot subchamber is less than a distance between two adjacent apexes of the rotor.

In some embodiments, the injector is a dual-needle injector.

In some embodiments, the fluid includes liquid water.

In another aspect, there is provided a method of mitigating auto-ignition of a mixture of air and fuel into a combustion chamber of a rotary engine, the combustion chamber defined by an outer body and a rotor received in a rotor cavity of the outer body, the outer body defining a pilot subchamber communicating with the combustion chamber, the method comprising: injecting the fuel into the combustion chamber while bypassing the pilot subchamber with a main injector; compressing the mixture by decreasing a volume of the combustion chamber with a rotation of the rotor; cooling the mixture by injecting a fluid into the combustion chamber while bypassing the pilot subchamber with the main injector; and igniting the mixture by igniting a pilot mixture of the fuel and the air into the pilot subchamber and by injecting the pilot mixture into the combustion chamber.

The method described above may include any of the following features, in any combinations.

In some embodiments, the injecting of the fluid into the combustion chamber includes injecting the fluid into the combustion chamber before a temperature of the mixture reaches an auto-ignition temperature.

In some embodiments, the injecting of the fluid into the combustion chamber includes injecting the fluid into the combustion chamber before a volume of the combustion chamber reaches a minimum volume.

In some embodiments, the injecting of the fluid and the injecting of the fuel includes injecting the fluid via a fluid outlet of the main injector and injecting the fuel via a fuel outlet of the main injector, the fuel outlet being distinct than the fluid outlet.

In some embodiments, the injecting of the fuel includes injecting one or more of hydrogen and liquified natural gas.

In some embodiments, a distance between a tip of main injector and the pilot subchamber is less than a distance between two adjacent apexes of the rotor.

In some embodiments, the injecting of the fluid includes injecting the fluid including water being in a liquid phase.

In yet another aspect, there is provided a hydrogen-powered rotary engine, comprising: an outer body defining a rotor cavity; a rotor rotatable within the outer body, the outer body and the rotor defining a combustion chamber of variable volume in the rotor cavity; a pilot subchamber defined by the outer body, the pilot subchamber having an outlet in fluid flow communication with the rotor cavity; a pilot injector having a pilot tip in communication with the pilot subchamber; a main injector having a tip in communication with the rotor cavity at a location spaced apart from the outlet of the pilot subchamber, the main injector having a fuel inlet fluidly connected to a source of hydrogen, a fluid inlet fluidly connected to a fluid source, and an injector outlet in fluid communication with the rotor cavity independently of the pilot subchamber, the main injector having: a fuel-injection configuration in which the main injector fluidly connects the source of hydrogen to the combustion chamber via the injector outlet; and a fluid-injection configuration in which the main injector fluidly connects the fluid source to the combustion chamber via the injector outlet.

The hydrogen-powered rotary engine described above may include any of the following features, in any combinations.

In some embodiments, a controller is operatively connected to the main injector and to the pilot injector, the controller having a processing unit and a computer-readable medium having instructions stored thereon causing the processing unit to: inject the fuel into the combustion chamber with the main injector; inject the fluid into the combustion chamber before a temperature of a mixture of air and the fuel into the rotor cavity reaches an auto-ignition temperature; and ignite of the mixture by igniting a pilot mixture of the fuel and the air into the pilot subchamber.

In some embodiments, the instructions cause the processing unit to inject the fluid into the rotor cavity before a volume of the combustion chamber reaches a minimum volume.

In some embodiments, the outlet of the main injector includes a fuel outlet and a fluid outlet spaced apart from the fuel outlet, the fuel outlet fluidly connected to the source of hydrogen in the fuel-injection configuration, the fluid outlet fluidly connected to the fluid source in the fluid-injection configuration.

In some embodiments, the fluid includes water in a liquid phase and alcohol.

DESCRIPTION OF THE DRAWINGS

Reference is now made to the accompanying figures in which.

DETAILED DESCRIPTION

Figure 1:
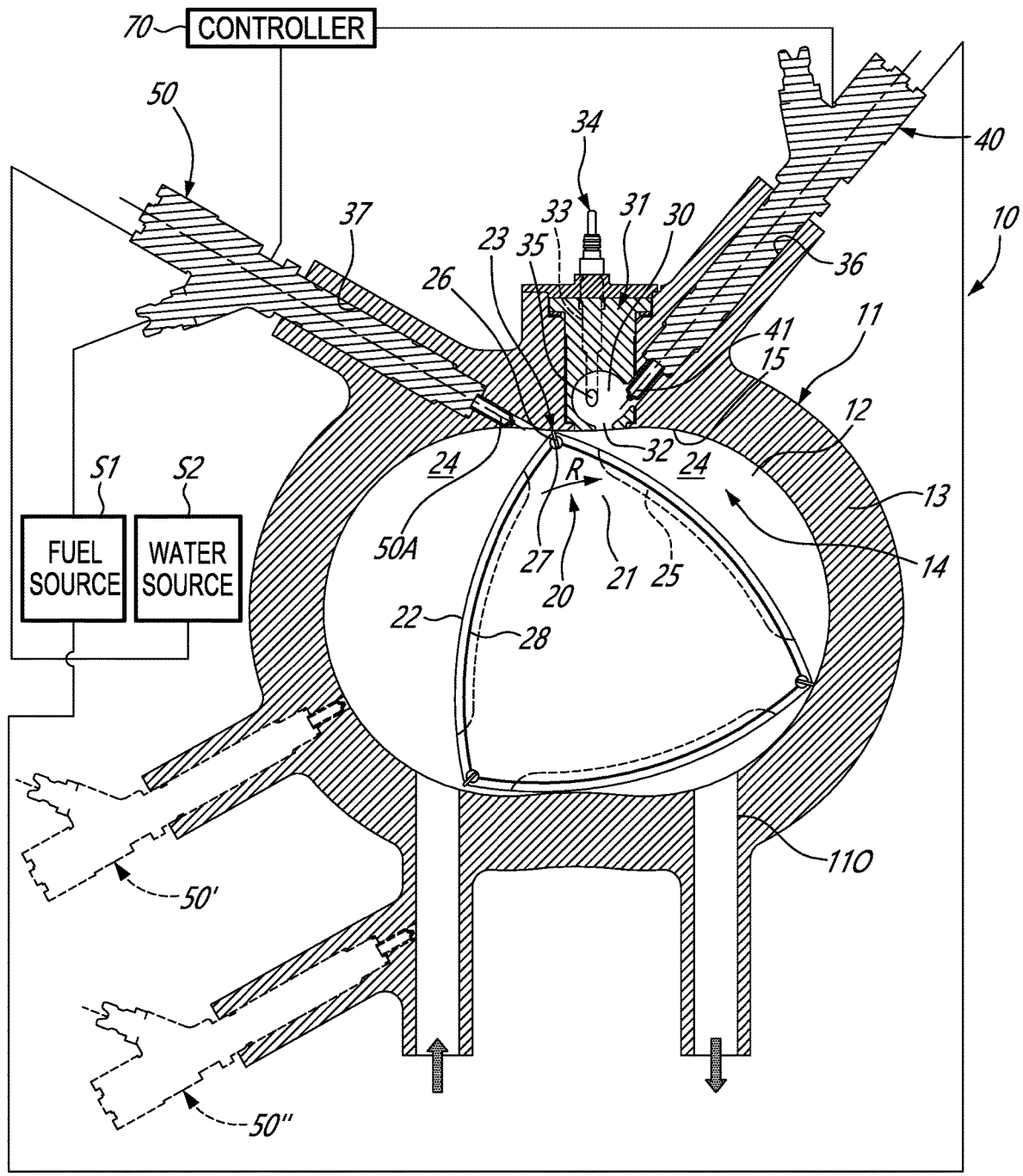
FIG. 1 is a cross-sectional view of a rotary engine in accordance with one embodiment.

Referring to FIG. 1, a rotary internal combustion engine, referred to below as a rotary engine, is shown at 10. The rotary engine 10 is known as a Wankel engine and comprises an outer body 11 having axially-spaced end walls, or side housings, 12 with a peripheral wall, or rotor housing, 13 extending therebetween to form an internal cavity 14. An inner surface 15 of the rotor housing 13 has a profile defining two lobes, which is preferably an epitrochoid.

An inner body or rotor 20 is received within the internal cavity 14, with the geometrical axis of the rotor 20 being offset from and parallel to the axis of the outer body 11. The rotor 20 has axially spaced end faces 21 adjacent to the side housings 12, and a peripheral face 22 extending therebetween. The peripheral face 22 defines three circumferentially-spaced apex portions 23, and a generally triangular profile with outwardly arched sides. The apex portions 23 are in sealing engagement with the inner surface 15 of the rotor housing 13 to form three rotating working chambers 24 (only two being labelled on FIG. 1) between the rotor 20 and outer body 11. A recess 25 may be defined in the peripheral face 22 of the rotor 20 between each pair of adjacent apex portions 23, to form part of the corresponding chamber 24. In some embodiments, the recess 25 may be omitted.

The working chambers 24 are sealed. Each rotor apex portion 23 has an apex seal 26 extending from one end face 21 to the other and protruding radially from the peripheral face 22. Each apex seal 26 is biased radially outwardly against the inner surface 15 of the rotor housing 13 through a respective spring. An end seal 27 engages each end of each apex seal 26, and is biased against the respective side housing 12 through a suitable spring. Each end face 21 of the rotor 20 has at least one arc-shaped face seal 28 running from each apex portion 23 to each adjacent apex portion 23, adjacent to but inwardly of the rotor periphery throughout its length. A spring urges each face seal 28 axially outwardly so that the face seal 28 projects axially away from the adjacent rotor end face 21 into sealing engagement with the adjacent side housing 12 of the internal cavity 14. Each face seal 28 is in sealing engagement with the end seal 27 adjacent each end thereof.

Although not shown in FIG. 1, the rotor 20 is journaled on an eccentric portion of a shaft and includes a phasing gear co-axial with the rotor axis, which is meshed with a fixed stator phasing gear secured to the outer body co-axially with the shaft. The rotor 20 rotates the shaft and the meshed gears guide the rotor 20 to perform orbital revolutions within the internal cavity 14. The shaft performs three rotations for each orbital revolution of the rotor 20 in the internal cavity 14. Oil seals are provided around the phasing gear to prevent leakage flow of lubricating oil radially outwardly thereof between the respective rotor end face 21 and outer body side housing 12.

An intake port 111 is defined through one of the side housings 12 or the rotor housing 13 for admitting air (atmospheric or compressed via a compressor) into one of the working chambers 24, and at least one exhaust port 110 is defined through one of the side housings 12 or the rotor housing 13 for discharge of the exhaust gases from the working chambers 24. The inlet and exhaust ports are positioned relative to each other and relative to the ignitor and fuel injectors such that during each revolution of the rotor 20, each chamber 24 moves around the internal cavity 14 with a variable volume to undergo the four phases of intake, compression, expansion, and exhaust, these phases being similar to the strokes in a reciprocating-type internal combustion engine having a four-stroke cycle.

In a particular embodiment, these ports are arranged such that the rotary engine 10 operates under the principle of the Miller or Atkinson cycle, with its volumetric compression ratio lower than its volumetric expansion ratio. In another embodiment, the ports are arranged such that the volumetric compression and expansion ratios are equal or similar to one another.

Still referring to FIG. 1, a pilot cavity is defined in the outer body 11, for pilot fuel injection and ignition. In the embodiment shown example, the pilot cavity is in the form of a pilot subchamber 30, provided in an insert 31 received in a corresponding insert opening defined through the rotor housing 13 of the outer body 11 and in communication with the internal cavity 14, for pilot fuel injection and ignition. The pilot subchamber 30 is thus located radially outwardly of the inner surface 15 of the rotor housing 13. In a particular embodiment, the insert 31 is made of a material having a greater heat resistance than that of the rotor housing 13, which may be made for example of aluminium. For example, the insert 31 may be made of an appropriate type of ceramic or of an appropriate type of super alloy such as a Nickel based super alloy. Other configurations are also possible, including configurations where the pilot cavity (e.g. pilot subchamber 30) is defined directly in the outer body 11, for example in the rotor housing 13.

The pilot subchamber 30 is in communication with the internal cavity 14. In the embodiment shown, the pilot subchamber 30 has a circular cross-section; alternate shapes are also possible. The pilot subchamber 30 communicates with the internal cavity 14 through at least one opening or outlet 32, and has a shape forming a reduced cross-section adjacent the opening outlet 32, such that the outlet 32 defines a restriction to the flow between the pilot subchamber 30 and the internal cavity 14. The outlet 32 may have various shapes and/or be defined by multiple holes.

The insert 31 and/or rotor housing 13 have an ignitor elongated hole 33 defined therein, also in communication with the pilot subchamber 30. An ignitor 34 or ignition element is received and retained within the corresponding hole, with the tip of the ignitor 34 communicating with the pilot subchamber 30, for example by having the ignitor 34 extending outside of the pilot subchamber 30 and the ignitor elongated hole communicating with the pilot subchamber 30 through an opening or passage 35 aligned with the ignitor tip. In the embodiment shown, the ignitor 34 is a glow plug. Alternate types of ignitors 34 which may be used include, but are not limited to, plasma ignition, laser ignition, spark plug, microwave, etc.

A volume of the pilot subchamber 30 may range from 0.5% to 3.5% of a total engine volume as described in U.S. Pat. No. 11,215,110, the entire contends of which are incorporated herein by reference.

The rotor housing 13 has a pilot injector elongated hole 36 defined therethrough in proximity of the pilot subchamber 30, and in communication with the pilot subchamber 30. A pilot fuel injector, referred to below as a pilot injector 40, is received and retained within the corresponding hole 36, with the tip 41 of the pilot injector 40 in communication with the pilot subchamber 30.

The rotor housing 13 also has a main injector elongated hole 37 defined therethrough, in communication with the internal cavity 14 and spaced apart from the pilot cavity and pilot injector 40. A main injector 50 is received and retained within this corresponding hole 37, with the tip 50A of the main injector 50 communicating with the internal cavity 14 at a point spaced apart from the communication between the outlet 32 of the pilot subchamber 30 and internal cavity 14. The main injector 50 is located rearward of the outlet 32 with respect to the direction R of the rotor rotation and revolution, i.e. upstream from the outlet 32 between the pilot subchamber 30 and working chambers 24, and is angled to direct fuel forwardly into each of the rotating chambers 24 sequentially with a tip hole configuration designed for an adequate spray. The main injector 50 therefore communicates with the combustion chambers independently of the subchamber 30. That is, fuel injected by the main injector 50 flows directly into the combustion chamber without flowing through the pilot subchamber 30.

The pilot injector 40 and main injector 50 inject fuel, which in a particular embodiment is heavy fuel e.g. diesel, kerosene (jet fuel), equivalent biofuel, etc. into the chambers 24. However, in the present embodiment, the fuel is one or more of hydrogen and liquified natural gas (LNG). The pilot injector 40 and the main injector 50 may each inject a respective fuel different from one another. For instance, the pilot injector may inject a heavy fuel while the main injector 50 may inject the hydrogen and/or the LNG.

The pilot subchamber 30 may help create a stable and powerful ignition zone to ignite the overall lean working chamber 24 to create the stratified charge combustion. The pilot subchamber 30 may improve combustion stability, particularly, but not exclusively, for a rotary engine which operates with heavy fuel below the self-ignition of fuel. The insert 31 made of a heat resistant material may advantageously create a hot wall around the pilot subchamber 30 which may further help with ignition stability.

In a particular embodiment, the rotary engine 10 is operated in accordance with the following. A pilot quantity of fuel is delivered into the pilot subchamber 30 and ignited within the pilot subchamber 30, and a main quantity of fuel is delivered into the working chambers 24 downstream of their communication with the pilot subchamber 30. When the rotary engine 10 operates at maximum load, both the pilot quantity and the main quantity may correspond to a maximum pilot and main injection fuel flow, respectively. However, when the rotary engine 10 operates at part load, some of the pilot and/or main injections are reduced or skipped, so as to reduce the fuel consumption, noise and/or vibrations on the rotary engine 10. Accordingly, one or both of the pilot and main quantity is varied between successive rotations of the shaft, i.e. between successive working chambers 24 (since the shaft performs three rotations for each complete revolution of the rotor 20, each shaft rotation corresponds to fuel injection in one of the working chambers 24). For example, the pilot and/or main injection quantity may be zero (skipped injection) for at least one of the successive rotations of the shaft, and greater than zero (e.g., maximum value) for at least another one of the successive rotations of the shaft.

Various injection patterns may be used to vary the quantity of fuel injected by the pilot and/or main injector(s) 40, 50 between the successive rotations of the shaft. In a particular embodiment, the injection pattern is repeated for each set of first, second and third successive rotations of the shaft, and accordingly each of the three working chambers 24 has its particular injection conditions. For example, for the first shaft rotation (first working chamber 24), the main quantity is zero and the pilot quantity is greater than zero, i.e. the main injection is skipped while a pilot injection is performed; for the second rotation (second working chamber 24), the main and pilot quantities are both zero, i.e. both the main and pilot injections are skipped; and for the third rotation (third working chamber 24), the main and pilot quantities are both greater than zero, i.e. a pilot and main injections are both performed.

In the present embodiment, a distance between the tip of main injector 50 and the pilot subchamber 30 is less than a distance between two adjacent apexes 23 of the rotor 20. This may ensure that both of the tip of the main injector 50 and the outlet 32 of the pilot subchamber 30 are simultaneously in fluid flow communication with a common one of the combustion chambers 24. More specifically, the fuel injected in the pilot subchamber 30 may be used to ignite the fuel injected into the combustion chamber 24. Thus, upon ignition of the fuel in the pilot subchamber 30, the ignited fuel flows out of the pilot subchamber 30 via the outlet 32 to reach the combustion chamber 24 thereby igniting the fuel received therein. This configuration may allow the use of two different types of fuel each having their respective advantages.

Still referring to FIG. 1, the pilot injector 40 and the main injector 50 may both be fluidly connected to a fuel source S1 and may both be operable to inject a main fuel from the fuel source S1. The pilot injector 40 and the main injector 50 are operatively connected to a controller 70 operable to cause injection of the fuel. More detail about this are presented below. The pilot injector 40 has a first configuration in which the pilot injector 40 fluidly connects the fuel source S1 to the pilot subchamber 30 and a second configuration in which the pilot injector 40 blocks fluid communication between the fuel source S1 and the pilot subchamber 30.

In the present embodiment, the main fuel is hydrogen or liquefied natural gas (LNG). These fuels may lower a temperature of exhaust gas emissions. However, their physical properties increase the risk of unexpected auto-ignition depending of a compression ratio of the rotary engine 10. Put differently, it is desired to control the ignition with the pilot subchamber so that ignition occurs precisely when required. Hydrogen or LNG may be subject to spontaneous combustion (i.e., autoignition) if they reach a threshold temperature as it is compressed in the rotary engine during a compression stroke of the rotor 20. It may therefore be desired to reduce a temperature of a mixture of fuel and air in the combustion chamber of the rotary engine 10 to prevent the auto-ignition of the mixture. As will be described below, water may be injected in the combustion chamber 24 to cool down the mixture and/or walls enclosing the combustion chamber 24. As explained above, these walls are defined by the housings and the rotor 20 of the rotary engine 10.

The text below will refer to water as the cooling fluid. It will be appreciated, however, that the cooling fluid may be water or a mixture of water and any other fluid, such as alcohol, to prevent freezing at high altitudes during cruise. Water may be used for ground application and a water-alcohol mixture may be used for flight applications. A major portion of the mixture (e.g., more than 50% by weight) corresponds to the water. The other component in the mixture may be any suitable anti-freezing agent.

As depicted in FIG. 1, the main injector 50 is further fluidly connected to a water source S2. The main injector 50 thus has a fuel-injection configuration in which the main injector 50 fluidly connects the fuel source S1 to the combustion chamber 24. The main injector 50 has a water-injection configuration in which the main injector 50 fluidly connects the water source S2 to the combustion chamber 24. The fuel-injection configuration and the water-injection configuration may occur simultaneously. That is, the main injector 50 may be able to simultaneously fluidly connect both of the fuel source S1 and the water source S2 to the combustion chamber 24 via the same common outlet of the main injector 50 or via respective dedicated outlets. Alternatively, in the fuel-injection configuration, the main injector 50 may fluidly disconnect the water source S2 from the combustion chamber 24. In the water-injection configuration, the main injector 50 may fluid disconnect the fuel source S1 from the combustion chamber 24. The main injector 50 has a closed configuration in which the main injector 50 fluidly disconnects both of the fuel source S1 and the water source S2 from the combustion chamber 24.

As aforementioned, an outlet defined by a tip of the pilot injector 40 is in fluid communication with the combustion chamber 24 through the pilot subchamber 30, and outlet(s) defined by the tip 50A of the main injector 50 is (are) in fluid communication with the combustion chamber 24 independently of the pilot subchamber 30. In other words, the main injector 50 injects fuel into the combustion chamber 24 while bypassing the pilot subchamber 30.

In some embodiments, the injectors 40, 50 each have two inlets and two outlets for injecting two different fuels. Such an exemplary injector is described below with reference to FIG. 4. Alternatively, the injectors 40, 50 may have a single outlet and two distinct inlets. The injector may thus be operatable to selectively fluidly connect either one of the two distinct inlets to the single outlet. In other words, in some engine configurations, the injector may not need to distinct outlets.

The controller 70 is operatively connected to both of the main injector 50 and the pilot injector 40. The controller 70 is configured to inject the fuel into the combustion chamber 24 with the main injector 50; inject of the water into the combustion chamber 24 before a temperature of a mixture of air and the fuel into the combustion chamber 24 reaches an auto-ignition temperature; and ignite of the mixture by igniting a pilot mixture of the fuel and the air into the pilot subchamber 30.

Put differently, in operation, air is injected into the combustion chamber 24 via the intake port 111. Fuel is also injected in the combustion chamber 24 via the main injector 50. The rotor 20, via its rotation, decreases a volume of the combustion chamber 24 thereby compressing of a mixture of the air and the fuel contained in the combustion chamber 24 and thus increasing a temperature of the mixture. It may be desired to cool down the mixture to avoid its auto-ignition. To do so, the main injector 50 proceeds to inject water, preferably in a liquid phase, into the combustion chamber 24. Evaporation of the water from the liquid phase to a gaseous phase absorbs energy thereby decreasing the temperature of the mixture to prevent its auto-ignition. In some embodiments, the auto-ignition temperature may be achieved when a volume of the combustion chamber 24 is at or close to its minimum volume. Hence, the controller 70 may cause the injection of the water with the main injector 50 before the volume of the combustion chamber 24 reaches its minimum value.

Figure 2:
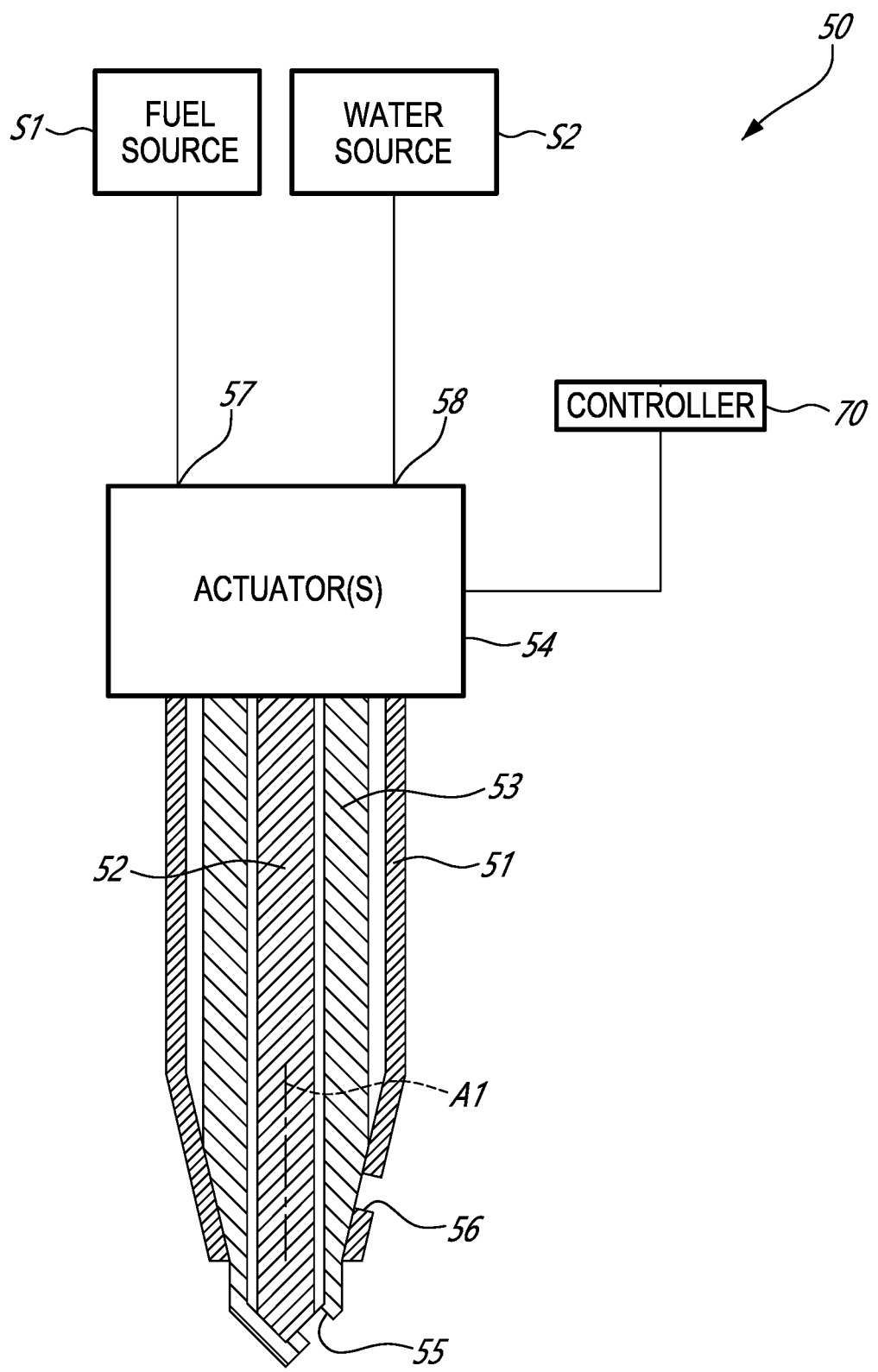
FIG. 2 is a cross-sectional view of a fuel injector in accordance with one embodiment to be used with the rotary engine of FIG. 1.

Referring now to FIG. 2, the main injector 50 is described in greater detail. The main injector 50 may be referred to as a "dual-needle injector". The main injector 50 has a main body 51 enclosing a needle assembly comprising an inner needle 52 and an outer needle 53. The outer needle 53 is hollow and the inner needle 52 is received within the outer needle 53. One or more actuator(s) 54 are engaged to the inner needle 52 and the outer needle 53 to control their axial motion relative to a central axis A1 and relative to the main body 51. The one or more actuator(s) 54 may be electronically controlled and operatively connected to a controller 70. The one or more actuator(s) 54 may be solenoid, fuel-draulic actuators, hydraulic actuators, pneumatic actuators and so on. The injector 50 has a tip defined by the outer needle 53. The outer needle 53 defines a first outlet 55 of the injector 50 whereas the main body 51 defines a second outlet 56 of the injector 50. The first outlet 55 and the second outlet 56 are spaced apart from one another and may output fuel at different directions. In the present embodiment, the second outlet 56 injects fuel in a direction having a radial component relative to the central axis A1 if the injector 50. The first outlet 55 is defined by one or more aperture(s) and the second outlet 56 is defined by one or more aperture(s). It will be appreciated that any injector able to inject two different fuels via two different outlets may be used without departing from the scope of the present disclosure.

The first outlet 55 and the second outlet 56 are separated and distinct from one another. Put differently, fuel may be injected via the first outlet 55 while the second outlet 56 remains closed. Similarly, fuel may be injected via the second outlet 56 while the first outlet 55 remains closed. In some cases, fuel may be injected simultaneously by both of the first outlet 55 and the second outlet 56. The fuel(s) flow through the injector 50 along respective flow paths that remain independent until they are outputted via the first outlet 55 and the second outlet 56. Herein, the expression "independent" implies that the fuels are not mixed within the injector 50. The fuels remain isolated and separated from one another.

The fuel injector 50 has a first inlet 57 fluidly connected to the first outlet 55 and a second inlet 58 fluidly connected to the second outlet 56. The injector 50 may have a first configuration in which the first inlet 57 is fluidly connected to the first outlet 55 while the second inlet 58 is fluidly disconnected from the second outlet 56; a second configuration in which the first inlet 57 is fluidly disconnected from the first outlet 55 and in which the second inlet 58 is fluidly connected to the second outlet 56, a third configuration in which the first inlet 57 is fluidly connected to the first outlet 55 and in which the second inlet 58 is fluidly connected to the second outlet 56, and a fourth configuration in which both of the first inlet 57 and the second inlet 58 are fluidly disconnected from their respective first outlet 55 and the second outlet 56.

The first inlet 57 may correspond to a fuel outlet of the main injector 50 whereas the second inlet 58 may correspond to a water outlet of the main injector 50. Alternatively, the main injector 50 may have a single outlet selectively fluidly connectable to one or both of the first inlet 57 and the second inlet 58.

Referring back to FIG. 1, in an alternate embodiment, the tip 50A of the main injector 50 may be located at position denoted by reference numeral 50'. At this alternate location, the tip 50A of the main injector 50 is located further away from the pilot subchamber 30. Hence, the fuel and the water may be injected sooner during a compression phase of the rotor 20. In another embodiment, the tip 50A of the main injector 540 may be located at position denoted by reference numeral 50". At location 50", the tip 50A injects the fuel and water directly into the intake port 111 of the rotary engine 10. That is, the fuel and the water is injected upstream of the combustion chamber 24. This may allow to leverage the water injection for different combustion modes such as premixed or partially premixed.

Figure 3:
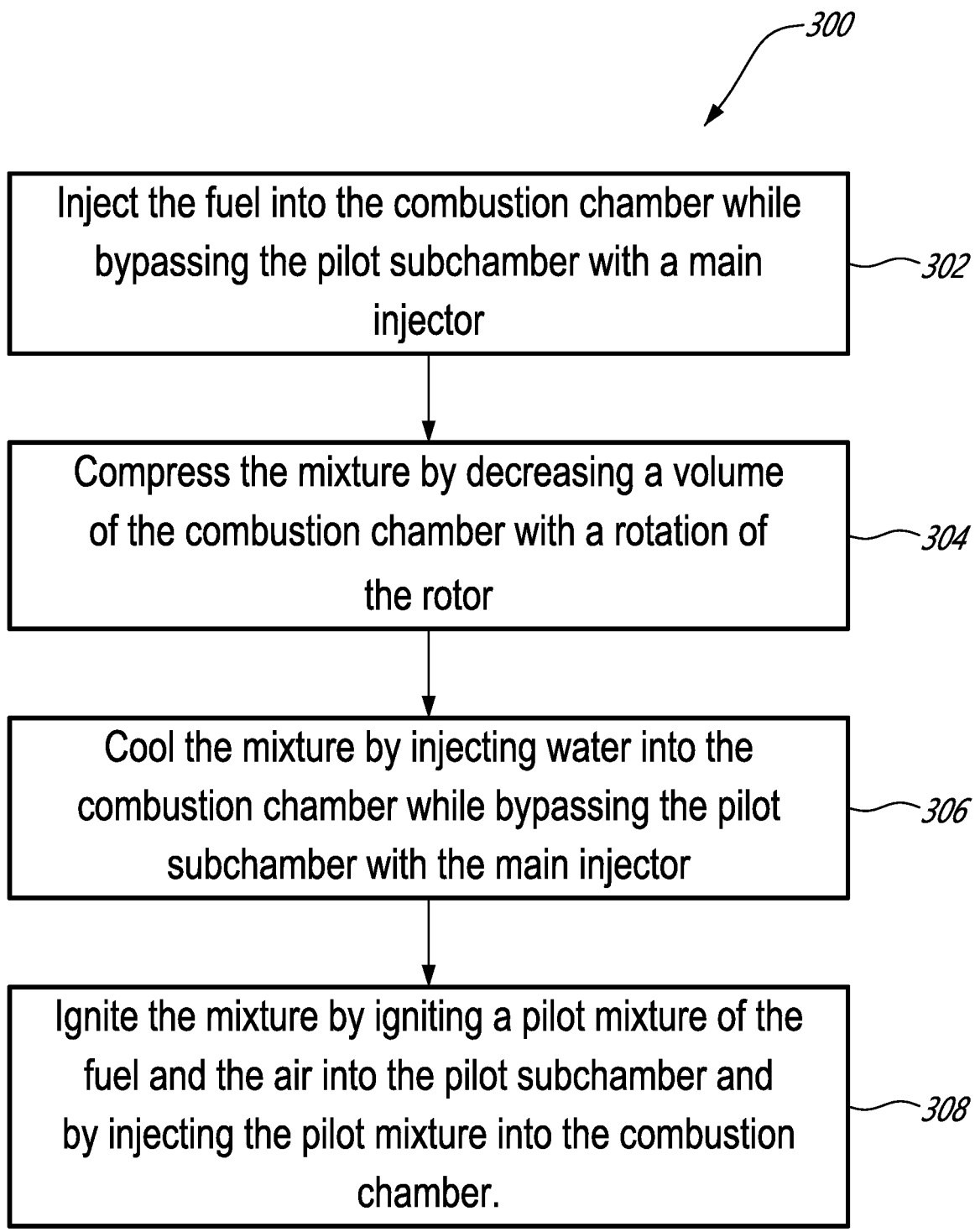
FIG. 3 is a flowchart illustrating steps of a method of mitigating auto-ignition of a mixture of air and fuel in a combustion chamber of the rotary engine of FIG. 1.

Referring now to FIG. 3, a method of mitigating auto-ignition of a mixture of air and fuel into the combustion chamber 24 of the rotary engine 10 is shown at 300. The method 300 includes: injecting the fuel into the combustion chamber 24 while bypassing the pilot subchamber 30 with the main injector 50 at 302; compressing the mixture by decreasing a volume of the combustion chamber 24 with a rotation of the rotor 20 at 304; cooling the mixture by injecting water into the combustion chamber 24 while bypassing the pilot subchamber 30 with the main injector 50 at 306; and igniting the mixture by igniting a pilot mixture of the fuel and the air into the pilot subchamber 30 and by injecting the pilot mixture into the combustion chamber 24 at 308.

In the embodiment shown, the injecting of the water into the combustion chamber 24 at 306 includes injecting the water into the combustion chamber 24 before a temperature of the mixture reaches an auto-ignition temperature. In some embodiments, the injecting the water into the combustion chamber 24 is performed before a volume of the combustion chamber 24 reaches a minimum volume.

The cooling of the mixture at 306 and the injecting of the fuel at 302 include injecting the water via the water outlet 56 of the main injector 50 and injecting the fuel via the fuel outlet 55 of the main injector 50. As depicted in FIG. 2, the fuel outlet 55 is distinct than the water outlet 56. Herein, the expression "distinct" implies two separate passages. That is, the fuel and the water pass via respective separate conduits.

In the embodiment shown, the injecting of the fuel at 302 includes injecting one or more of hydrogen and liquified natural gas. The cooling of the mixture at 306 includes injecting the water in a liquid phase.

The disclosed configuration of the rotary engine 10 using the water injection may permit the cooling of the air thereby reducing a size of an intercooler for a given operating point. Indeed, since the temperature inside the combustion chamber 24 is lowered, less heat may need to be extracted from the outer body 11 of the rotary engine 10. Thus, the heat exchanger may be reduced in size. This may permit weight reduction and efficiency gains for aerospace applications.

Moreover, the water injection may mitigate the likely hood of pre-ignition when using fuel such as hydrogen or LNG. This may allow for a better control of the combustion for such fuels. This is particularly interesting when used with the rotary engine 10 that includes a pilot subchamber 30 as it contains high temperature gases, which favors an undesired preignition.

The water injection may reduce the formation of NOx by reducing the maximum temperature within the combustion chamber 24. Additionally, when using hydrogen as the main fuel, the cooling effect produced by the injected water may be used to mitigate the potential for hydrogen pre-ignition, hence allowing a better control of the combustion process specifically at high loads and hot ambient conditions.

In other words, the pilot subchamber 30 in the rotary engine 10 runs at high temperatures, which may be much higher than the rest of the outer body 11. Thus, in the context of hydrogen fueled engine, ignition of the fuel may happen before the pilot injection in the subchamber has ignited. The water injection may ensure that the pilot subchamber 30 controls the ignition of the fuel injected via the main injector 50 by mitigating pre-ignition. Moreover, the intercooler that is used to control the intake temperature of the air via the intake port 111 is sized for the worst conditions of ambient temperature and intake flow. However, those conditions represent a very small mount of an aircraft mission but require a important increase in the size of the intercooler. Having water injection may allow cooling the air for those very specific conditions, and thus the size of the intercooler may be reduced. This may be beneficial in term of weight and volume for an aircraft engine.

Figure 4:
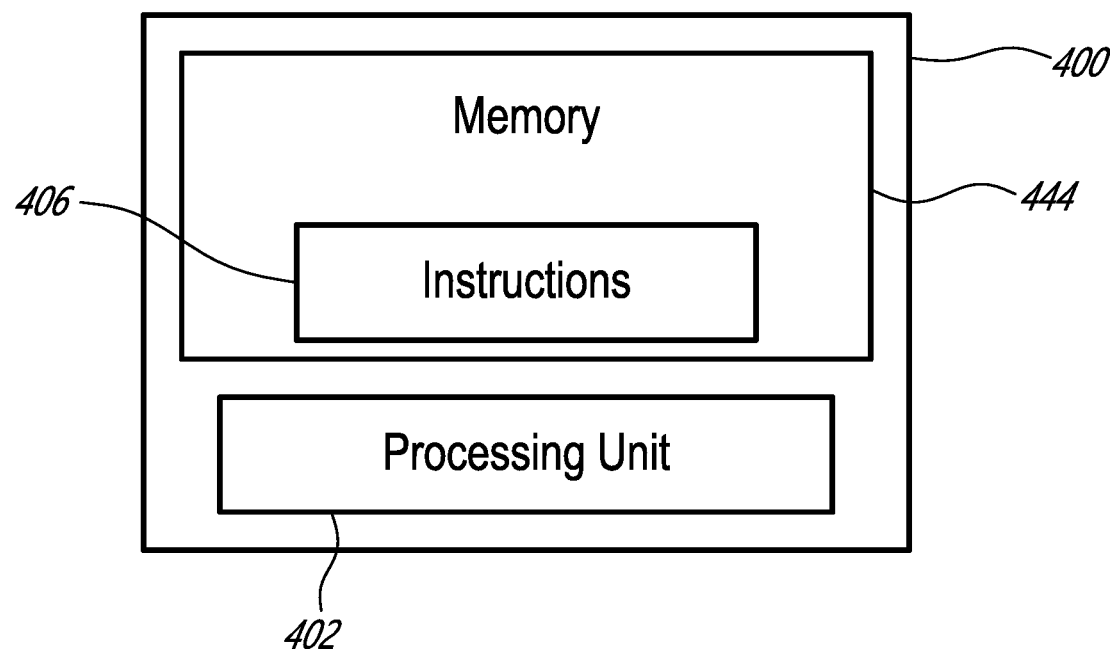
FIG. 4 is a schematic representation of a computing device of a controller of the rotary engines of FIGS. 1-3.

With reference to FIG. 4, an example of a computing device 400 is illustrated. For simplicity only one computing device 400 is shown but the system may include more computing devices 400 operable to exchange data. The computing devices 400 may be the same or different types of devices. The controller 70 may be implemented with one or more computing devices 400. Note that the controller 70 can be implemented as part of a full-authority digital engine controls (FADEC) or other similar device, including electronic engine control (EEC), engine control unit (ECU), electronic propeller control, propeller control unit, and the like. In some embodiments, the controller 70 is implemented as a Flight Data Acquisition Storage and Transmission system, such as a FAST™ system. The controller 70 may be implemented in part in the FAST™ system and in part in the EEC. Other embodiments may also apply.

The computing device 400 comprises a processing unit 402 and a memory 404 which has stored therein computer-executable instructions 406. The processing unit 402 may comprise any suitable devices configured to implement the method 300 such that instructions 406, when executed by the computing device 400 or other programmable apparatus, may cause the functions/acts/steps performed as part of the method 300 as described herein to be executed. The processing unit 402 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 404 may comprise any suitable known or other machine-readable storage medium. The memory 404 may comprise non-transitory computer readable storage medium, for example, but not limited to, an electronic, magnetic, optical, electromagnetic, infrared, or semiconductor system, apparatus, or device, or any suitable combination of the foregoing. The memory 404 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 404 may comprise any storage means (e.g., devices) suitable for retrievably storing machine-readable instructions 406 executable by processing unit 402.

The methods and systems for igniting the mixture described herein may be implemented in a high level procedural or object oriented programming or scripting language, or a combination thereof, to communicate with or assist in the operation of a computer system, for example the computing device 400. Alternatively, the methods and systems for igniting the mixture may be implemented in assembly or machine language. The language may be a compiled or interpreted language. Program code for implementing the methods and systems for igniting the mixture may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for igniting the mixture may also be considered to be implemented by way of a non-transitory computer-readable storage medium having a computer program stored thereon. The computer program may comprise computer-readable instructions which cause a computer, or more specifically the processing unit 402 of the computing device 400, to operate in a specific and predefined manner to perform the functions described herein, for example those described in the method 300.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A rotary engine, comprising:
an outer body defining a rotor cavity;
a rotor rotationally received within the rotor cavity, the outer body and the rotor defining a combustion chamber of variable volume in the rotor cavity;
a pilot subchamber defined by the outer body, the pilot subchamber having an outlet in fluid flow communication with the rotor cavity;
a pilot injector having a pilot tip in communication with the pilot subchamber;
a main injector having a tip in communication with the rotor cavity at a location spaced apart from the outlet of the pilot subchamber, the main injector having a fuel inlet fluidly connected to a fuel source, a fluid inlet fluidly connected to a fluid source, and an injector outlet in fluid communication with the rotor cavity independently of the pilot subchamber, the main injector having:
a fuel-injection configuration in which the main injector fluidly connects the fuel source to the combustion chamber via the injector outlet; and
a fluid-injection configuration in which the main injector fluidly connects the fluid source to the combustion chamber via the injector outlet.

2. The rotary engine of claim 1, comprising a controller operatively connected to the main injector and to the pilot injector, the controller having a processing unit and a computer-readable medium having instructions stored thereon causing the processing unit to:
inject the fuel into the combustion chamber with the main injector;
inject the fluid into the combustion chamber before a temperature of a mixture of air and the fuel into the combustion chamber reaches an auto-ignition temperature; and
ignite of the mixture by igniting a pilot mixture of the fuel and the air into the pilot subchamber.

3. The rotary engine of claim 2, wherein the instructions cause the processing unit to inject the fluid into the combustion chamber before a volume of the combustion chamber reaches a minimum volume.

4. The rotary engine of claim 1, wherein the injector outlet of the main injector includes a fuel outlet and a fluid outlet distinct from the fuel outlet, the fuel outlet fluidly connected to the fuel source in the fuel-injection configuration, the fluid outlet fluidly connected to the fluid source in the fluid-injection configuration.

5. The rotary engine of claim 1, wherein the fuel is one or more of hydrogen and liquified natural gas.

6. The rotary engine of claim 1, wherein a distance between the tip of fuel injector and the pilot subchamber is less than a distance between two adjacent apexes of the rotor.

7. The rotary engine of claim 1, wherein the injector is a dual-needle injector.

8. The rotary engine of claim 1, wherein the fluid includes liquid water.

9. A method of mitigating auto-ignition of a mixture of air and fuel into a combustion chamber of a rotary engine, the combustion chamber defined by an outer body and a rotor received in a rotor cavity of the outer body, the outer body defining a pilot subchamber communicating with the combustion chamber, the method comprising:
injecting the fuel into the combustion chamber while bypassing the pilot subchamber with a main injector;
compressing the mixture by decreasing a volume of the combustion chamber with a rotation of the rotor;
cooling the mixture by injecting a fluid into the combustion chamber while bypassing the pilot subchamber with the main injector; and
igniting the mixture by igniting a pilot mixture of the fuel and the air into the pilot subchamber and by injecting the pilot mixture into the combustion chamber.

10. The method of claim 9, wherein the injecting of the fluid into the combustion chamber includes injecting the fluid into the combustion chamber before a temperature of the mixture reaches an auto-ignition temperature.

11. The method of claim 9, wherein the injecting of the fluid into the combustion chamber includes injecting the fluid into the combustion chamber before a volume of the combustion chamber reaches a minimum volume.

12. The method of claim 9, wherein the injecting of the fluid and the injecting of the fuel includes injecting the fluid via a fluid outlet of the main injector and injecting the fuel via a fuel outlet of the main injector, the fuel outlet being distinct than the fluid outlet.

13. The method of claim 9, wherein the injecting of the fuel includes injecting one or more of hydrogen and liquified natural gas.

14. The method of claim 9, wherein a distance between a tip of main injector and the pilot subchamber is less than a distance between two adjacent apexes of the rotor.

15. The method of claim 9, wherein the injecting of the fluid includes injecting the fluid including water being in a liquid phase.

16. A hydrogen-powered rotary engine, comprising:
an outer body defining a rotor cavity;

a rotor rotatable within the outer body, the outer body and the rotor defining a combustion chamber of variable volume in the rotor cavity;

a pilot subchamber defined by the outer body, the pilot subchamber having an outlet in fluid flow communication with the rotor cavity;

a pilot injector having a pilot tip in communication with the pilot subchamber;

a main injector having a tip in communication with the rotor cavity at a location spaced apart from the outlet of the pilot subchamber, the main injector having a fuel inlet fluidly connected to a source of hydrogen, a fluid inlet fluidly connected to a fluid source, and an injector outlet in fluid communication with the rotor cavity independently of the pilot subchamber, the main injector having:

a fuel-injection configuration in which the main injector fluidly connects the source of hydrogen to the combustion chamber via the injector outlet; and a fluid-injection configuration in which the main injector fluidly connects the fluid source to the combustion chamber via the injector outlet.

17. The hydrogen-powered rotary engine of claim 16, comprising a controller operatively connected to the main injector and to the pilot injector, the controller having a processing unit and a computer-readable medium having instructions stored thereon causing the processing unit to:

inject the fuel into the combustion chamber with the main injector;

inject the fluid into the combustion chamber before a temperature of a mixture of air and the fuel into the rotor cavity reaches an auto-ignition temperature; and ignite of the mixture by igniting a pilot mixture of the fuel and the air into the pilot subchamber.

18. The hydrogen-powered rotary engine of claim 17, wherein the instructions cause the processing unit to inject the fluid into the rotor cavity before a volume of the combustion chamber reaches a minimum volume.

19. The hydrogen-powered rotary engine of claim 16, wherein the outlet of the main injector includes a fuel outlet and a fluid outlet spaced apart from the fuel outlet, the fuel outlet fluidly connected to the source of hydrogen in the fuel-injection configuration, the fluid outlet fluidly connected to the fluid source in the fluid-injection configuration.

20. The hydrogen-powered rotary engine of claim 16, wherein the fluid includes water in a liquid phase and alcohol.

* * * * *